United States Patent [19]

Ng

[11] Patent Number: 5,493,385
[45] Date of Patent: Feb. 20, 1996

[54] ELECTROPHOTOGRAPHIC COLOR PRINTER APPARATUS AND METHOD WITH IMPROVED REGISTRATION OF COLORS

[75] Inventor: Yee S. Ng, Fairport, N.Y.

[73] Assignee: Eastman Kodak Company, Rochester, N.Y.

[21] Appl. No.: 353,001

[22] Filed: Dec. 9, 1994

[51] Int. Cl.⁶ ................................................. G03G 15/01
[52] U.S. Cl. .................. 355/326 R; 347/116; 347/248; 355/208; 355/212; 355/328
[58] Field of Search .................................... 355/211, 212, 355/213, 326 R, 327, 328, 203–208; 347/115, 116, 248

[56] References Cited

U.S. PATENT DOCUMENTS

| | | | |
|---|---|---|---|
| 4,082,443 | 4/1978 | Draugelis et al. | 355/326 R |
| 4,569,584 | 2/1986 | John et al. | 355/244 |
| 4,857,955 | 8/1989 | Crandall | 355/328 |
| 4,914,477 | 4/1990 | Young et al. | 355/208 |
| 4,937,635 | 6/1990 | Paxon et al. | 355/326 R |
| 5,040,003 | 8/1991 | Willis | 355/326 R |
| 5,075,702 | 12/1991 | Castelli et al. | 347/153 |
| 5,200,782 | 4/1993 | Castelli et al. | 355/212 |
| 5,229,787 | 7/1993 | Rees et al. | 355/327 X |
| 5,235,392 | 8/1993 | Hediger | 355/208 X |
| 5,262,826 | 11/1993 | Hediger | 355/212 |

Primary Examiner—Matthew S. Smith
Attorney, Agent, or Firm—Norman Rushefsky

[57] ABSTRACT

A multicolor non-impact printer is described that includes a photoconductive image receiver. The receiver is uniformly charged with an electrostatic charge. The receiver is then imagewise exposed by a first electronic exposure source to create a first electrostatic image. A toner of a first color is applied to the receiver to create a first toner image of the first color. The receiver is then exposed by a second electronic exposure source to create a second electrostatic image in the same general area as the first toner image. A toner of a second color is applied to the receiver to create a second toner image which, with the first toner image, forms a multicolor toner image. An encoder roller is associated with each exposure source and rotates with movement of said receiver and generates encoder position pulses. In response to the encoder position pulses, an address is generated for input to the look-up table. In response to this address, data is output from the look-up table for generating adjusted encoder position pulses for adjusting for nonuniformities in roller diameter and/or a variation in roller diameter from an ideal diameter.

6 Claims, 2 Drawing Sheets

ELECTROPHOTOGRAPHIC COLOR PRINTER APPARATUS AND METHOD WITH IMPROVED REGISTRATION OF COLORS

FIELD OF THE INVENTION

This invention relates to electrophotography and more precisely to electrophotographic marking engines for producing hard copy prints in two or more colors with improved color registration.

DESCRIPTION OF THE PRIOR ART

In the prior art as represented by U.S. Pat. No. 4,87,955, an electronic printer apparatus is described for printing hard copy prints with accent color. Typically, electronic information from a computer, word processor, image scanner or facsimile machine serves as a data source. The data from the data source is rasterized for printing by the printer apparatus which includes an electrophotoconductive web or drum. In printing of images with two colors, a first image to be recorded in one color is recorded by an electronic writer on one image frame of say the web and a second image to be recorded in the other color by the same writer is recorded on a second image frame. The image frames are then developed with different colored toners and transferred and fixed to a surface of a receiver sheet such as plain paper to form a two-color image. Since the images of the two colors are to be juxtaposed in many cases adjacent each other it is important in the production of quality prints that the registration of the colors be precise.

While the patent discloses that an encoder be used in control of the timing process, the fact that the encoder is not precise is not considered. For example, an encoder wheel associated with the web is assumed to track movement of the web in increments of say 1/300th or 1/600th of an inch by providing pulses at each of various positions of the wheel. In addition, the web itself may include frame and clock perforations for providing control of image frame locations and other process control regulation. While the frame perforations establish the location of a new frame, the commencement of printing of each line in the frame is controlled in response to encoder pulses. Where the roller is out of round or not exactly of optimum diameter, them can be a problem with registration of the colors. This registration problem can occur in image transfer systems where the color images on the image frames are transferred to a receiver sheet directly in two passes of the sheet or transferred in register to an intermediate transfer drum and then to a receiver in a single pass of the sheet or where one image is transferred to an intermediate drum or web, then transferred in register back to the original web and then transferred in one pass to the receiver sheet.

In U.S. Pat. No. 5,229,787, still another form of single pass color printer is described that uses a plurality of electronic writers, one for each color. In order to provide registration between colors, the writers are spaced at a multiple number, N, times the circumference, C, of a tensioning roller. The reason for this is that the tensioning roller is assumed to establish different web speeds along the web path but that the same web speeds occur at points on the web that are spaced apart a whole number of times the tension roller's circumference. A problem with this approach is that a constraint is provided of machine configuration so that where two or more writers are used, placements of the writers are limited to locations that are likely to have identical web speeds. An alternative suggested by this patent is the use of separate encoders for the writers which measure web speeds at the different print locations. A problem associated with measuring web speed is that errors in an encoder roller's diameter are not considered.

SUMMARY OF THE INVENTION

It is therefore an object of the invention to provide an improved color printer apparatus that provides for improved color registration even though encoder rollers are used that may not be of optimum diameter or may be out of round.

These and other objects of the invention are realized by an encoding device comprising a roller having a peripheral surface adapted to be engaged with said receiver for rotation as said receiver moves in engagement with said roller surface; encoder pulse generating means associated with said roller and generating encoder position pulses in response to rotation of said roller; a look-up table of data; means responsive to the encoder position pulses for generating an address to the look-up table; and means responsive to data output from the look-up table for generating adjusted encoder position pulses for adjusting for nonuniformities in the roller diameter and for a variation in roller diameter from an ideal diameter.

In accordance with another aspect of the invention, there is provided In a multicolor non-impact printer comprising a photoconductive image receiver; means for uniformly charging said receiver; means for imagewise exposing said receiver to create a first electrostatic image; means for applying a toner of a first color to said first electrostatic image to create a first toner image of said first color; means for imagewise exposing said receiver to create a second electrostatic image in the same general area as said first toner image; means for applying toner of a second color to said second electrostatic image to create a second toner image which, with said first toner image, forms multicolor toner image; wherein said means for exposing includes a line printhead device for recording a line of pixels; an encoder roller is associated with said line printhead device and the roller rotates with movement of said receiver and generates encoder position pulses; a look-up table of data; means is responsive to the encoder position pulses for generating an address to the look-up table; and means is responsive to data output from the look-up table for generating adjusted encoder position pulses for adjusting for nonuniformities in roller diameter and/or a variation in roller diameter from an ideal diameter.

In accordance with yet another aspect of the invention, there is provided A method for improving the registration of color images in a nonimpact printer, the method comprising rotating a peripheral surface of a roller that is engaged with a receiver that is to receive the color images; generating encoder position pulses in response to rotation of said roller; in response to the encoder position pulses generating an address to a look-up table; in response to data output from the look-up table generating adjusted encoder position pulses that adjust for nonuniformities in the roller diameter and for a variation in roller diameter from an ideal diameter; and in response to said adjusted encoder position pulses enabling recording of a line of picture elements on said receiver.

BRIEF DESCRIPTION OF THE DRAWINGS

In the derailed description of the preferred embodiment of the invention presented below, reference is made to the accompanying drawings, in which.

DESCRIPTION OF THE PREFERRED EMBODIMENTS

Figure 1:
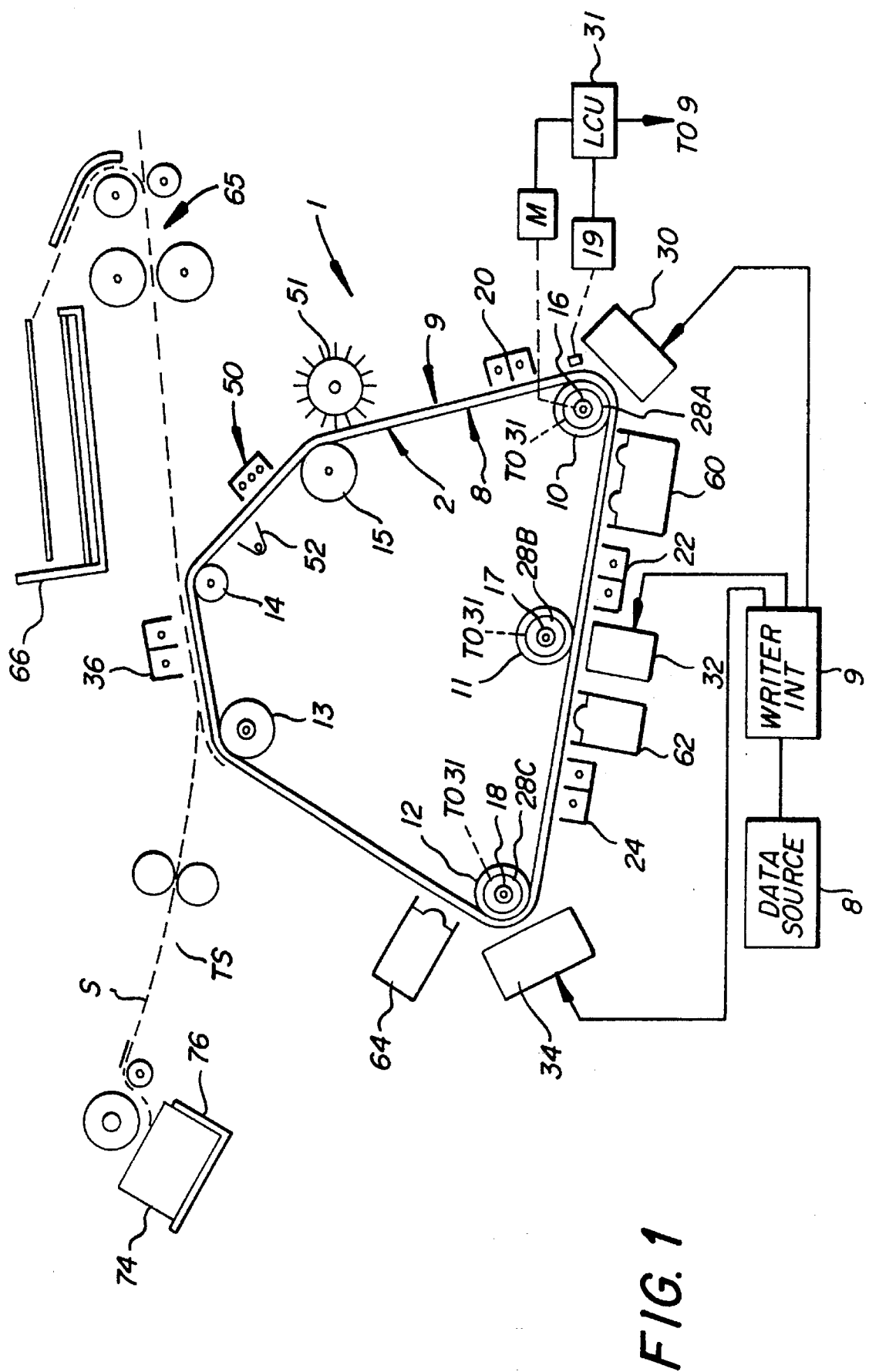
FIG. 1 is a schematic in side view of a preferred embodiment of my invention.

Because apparatus of the type described herein are well known, the present description will be directed in particular to elements forming part of or cooperating more directly with the present invention.

With reference to the accompanying figures, a schematic of an electrophotographic reproduction apparatus is shown which comprises one form of apparatus suitable for use with my invention.

The apparatus 1 includes a closed loop, flexible image transfer member, or photoconductive web 2. The web 2, is supported on rollers 10, 12, 13 and 15. The rollers are mounted on the apparatus' frame (not shown) with one of the rollers, for example, roller 10, rotatively driven by a motor, M, to effect continuous movement of the web 2 in a clockwise direction about its closed loop path. The web has a plurality of sequentially spaced, nonoverlapping image areas which pass successively through electrophotographic processing stations (charge, expose, develop, transfer, clean) located about the path of the web. The web also includes timing marks (or regularly spaced perforations) which are sensed by appropriate means, such as timing signal generator 19 to produce timing signals. Such signals are sent to a computer controlled logic and control unit (LCU) 31. The LCU 31 controls the entire electrophotographic process based on the instantaneous location of the web in the travel path. An encoder 28 associated with the roller 10 also produces timing signals for the LCU. The signals from the encoder cause the LCU to fine tune the process timing. The LCU 31 has one or more digital computers, preferably a microprocessor(s). The microprocessor has a stored program responsive to the input signals for sequentially actuating, then deactuating the work stations as well as for controlling the operation of many other machine functions.

Programming of a number of commercially available microprocessors is a conventional skill well understood in the art. This disclosure is written to enable a programmer having ordinary skill in the art to produce an appropriate control program for the microprocessor(s). The particular details of any such program would, of course, depend on the architecture of the designated microprocessor.

The LCU 31 typically comprises a temporary data storage memory, a central processing unit, a timing and cycle control unit, and a stored program control. Data input and output is performed sequentially under program control. Input data are applied either through input signal buffers to an input data processor or to an interrupt signal processor as is well known. The input signals are derived from various switches, sensors, and analog-to-digital converters. The output data and control signals are applied to storage latches which provide inputs to suitable output drivers, directly coupled to leads. These leads are connected to the various work stations, mechanisms and controlled components associated with the apparatus.

One or more corona charging units, exemplified by corona charger 20, is located upstream of the exposure area, and applies a uniform primary electrostatic charge to a surface 9 of the web 2 as it passes the charger and before it enters the first exposure area. The first exposure source or writer 30 records data to be reproduced with toner of a first color. The photoconductive properties of the web cause the primary charge in the exposed areas of the web to be discharged in that portion struck by exposure light. This forms a latent electrostatic image on the web in the exposed areas corresponding to the image to be printed. Thereafter, travel of the web then brings the image frame into a first development area. The development area has a magnetic brush development station 60 containing a toner having visible pigmentation of one color. In the preferred embodiment, one will have toner of black pigmentation, the second, 62, contains toner of another color pigmentation, for example red. Backup rollers (not shown) may be located on the opposite side of web 2 from each development station and actuators (not shown) may selectively move the respective backup rollers into contact with the web 12 to deflect the web from its travel path into operative engagement with respective magnetic brushes. The charged toner particles of the engaged magnetic brush are attracted to the discharged latent imagewise pattern areas to develop the pattern. Additional colors may also be provided for as exemplified by corona charger 24, exposure source 34 and developer station 64.

The logic and control unit 31 selectively activates an actuator in relation to the passage of an image frame that is to be processed with the respective color toner. Assume, for example, the first image frame is to be developed with black toner and the second image frame is to be developed with red toner. As the image frame containing the image to be developed in black reaches the development station 60, its respective actuator moves the backup roller to deflect the web so that the latent charge image is developed by attracting black toner particles from the station 60. As soon as the image area leaves the effective development area of the station, the actuator returns the backup roller to its nondeflecting position. A similar cycle is accomplished by the logic and control unit 31 for the development of the second and third colors containing the red and third color toner from station 62 and 64, respectively.

The image frame with the developed black and red toned images are transferred at transfer station TS to a receiver sheet to form a hard copy having both the red and black toned images. Briefly, this is accomplished by feeding a receiver sheet or support S of say plain paper, from a supply stack 74 stored in hopper 76, in synchronism with movement of the image frame so that the receiver sheet engages the web and is registered by a suitable known mechanism 80 with the image frame. The two-color images are transferred to the receiver sheet by transfer and detack charger 36. The copy sheet is separated from the web and conveyed by either vacuum transport or by an air transport to roller fuser 65 and then to exit hopper 66 or an accessory finishing unit. While the developed image is being fixed in fuser 65, the web 2 continues to travel about its path and proceeds through a cleaning area that includes a charger 50 and cleaning brush 51.

To facilitate toner removal from the web, a rear erase lamp 52 may be provided with the cleaning unit to reduce the adherence forces of the toner to the web.

In order to form the imaging exposure the LCU, in response to timing signals from the timing signal generator 19 and/or encoders 28A, B and C provides signals to a writer interface 9 which controls the flow of data signals from a data source 8 to the LED writers 30, 32, 34. The data signals illuminate through its output drivers light emitting diodes (LED's) in the writers. The LEDs of each writer may comprise a linear bank of LED arrays situated transverse to and proximate the web surface. The arrays of LEDs may selectively illuminate the web via a gradient index lens array (not shown), such as a SELFOC (trademark of Nippon Sheet Glass Co., Ltd.) arrays which focuses light from the linear arrays using optical fibers onto the photoconductor 2.

Electronic data signals from source 8 are used to modulate the LED imaging source which is then imaged upon the photoconductor. Other imaging sources such as laser or other light emitting devices or electrographic devices are also contemplated in implementing my invention. In the electrophotographic printer apparatus described, it is preferred to use a photoconductor and toning system that will attract toner particles to areas of the photoconductor that have been exposed. For reproduction of the first color image the LCU, via the printer or writer interface 9 activates the LED writer 30 to output a beam of light to expose each pixel size area for information to be reproduced in black. Similarly, for exposure of the information to be reproduced with the red pigmented toner on the same frame the signals from the LCU illuminate the LED writer to "print out" only that information which is to be developed with this toner.

The data source 8 may be a computer, word processor, image scanner or facsimile or the like that provides a stream of digitally coded or rasterized image signals to the printer interface 9. Data representing image information to be recorded on one image frame is sent to the printhead in rasterized data form one line at a time for recording by each LED writer 30, 32, 34. To ensure that the first line of recording on the second color aligns well with the first line in the first color, synchronization for commencing printing of each of these first lines is based on the detection in the rotating encoder of a mark or other indicium which will be in the same orientation for commencing recording of each of the frames. However, since different size sheets may be selected for receiving the two-color images, there is a need for the LCU 31 to determine the frame size. If we assume, for example, that the film belt or web is about 63 inches in length, the web is suited to record at least six image frames when A4 or B5 size papers are selected, 8.27"×11.69" and 7.17"×10.12", respectively. This assumes that a 12" printhead is used and disposed across the width of the web so that the images for these papers may be recorded with the long length of the papers extending across the web during image transfer. Thus for these papers a fame length of 10.5" is adequate assuming that a small interframe area is associated with each frame length.

For A3 size paper (11.69"×16.54"), a frame length of three frames per belt length is selected; i.e., 21" in this example. For B4 size paper (10.12"×14.33"), one can fit in four frames with a 15.75" frame length. The apparatus may include one or more paper trays that each have coded indicia representing size of paper in the tray. These indicia are sensed by conventional sensors in the apparatus and communicated to the LCU. The LCU has a table memory associating paper size with frame length and a suitable frame length is selected corresponding to that of the paper size selection. Selections of paper, as is well known, can be made either through selection of appropriate keys associated with the operator control panel or may be automatically determined by the LCU based on a calculation involving input image size and magnification requested as is also well known.

The rollers 10, 11 and 18 upon which the encoder wheels 28A, B and C are respectively mounted, each has a circumference such that the frame length for each paper format divided by the circumference is a whole number. In addition, the rollers are positioned relative to each other so that each image frame to be recorded has recording commenced with synchronization off the same location of each encoder wheel such as the head index position.

In accordance with the invention, there is provided an improved method and apparatus for registration of color images by minimizing registration errors created by minor errors in roller diameter. Consider a case where an ideal roller 10 has a roller diameter of 1.6711 inches. If the LED writer 30 is a 600 dpi writer and is to write at 600 lines per inch, the encoder can have indicia to generate 3150 (low resolution) encoder pulses per revolution of the roller. While the printed encoder indicia on the side of the roller may be considered accurate the surface of the roller transporting the web may not be accurate. Considering that if the second roller 11 is only two mils larger than the first, say at a diameter of 1.673 inches, the rollers may be in synchronization at the start of the image frame but after one full revolution of the rollers, there is a cumulative error of 6.3 mils. Since each pixel recording line is spaced at an interval of $\frac{1}{600}$ inches which is about 1.7 mils, it is apparent that registration of the colors will be a problem.

Figure 3:
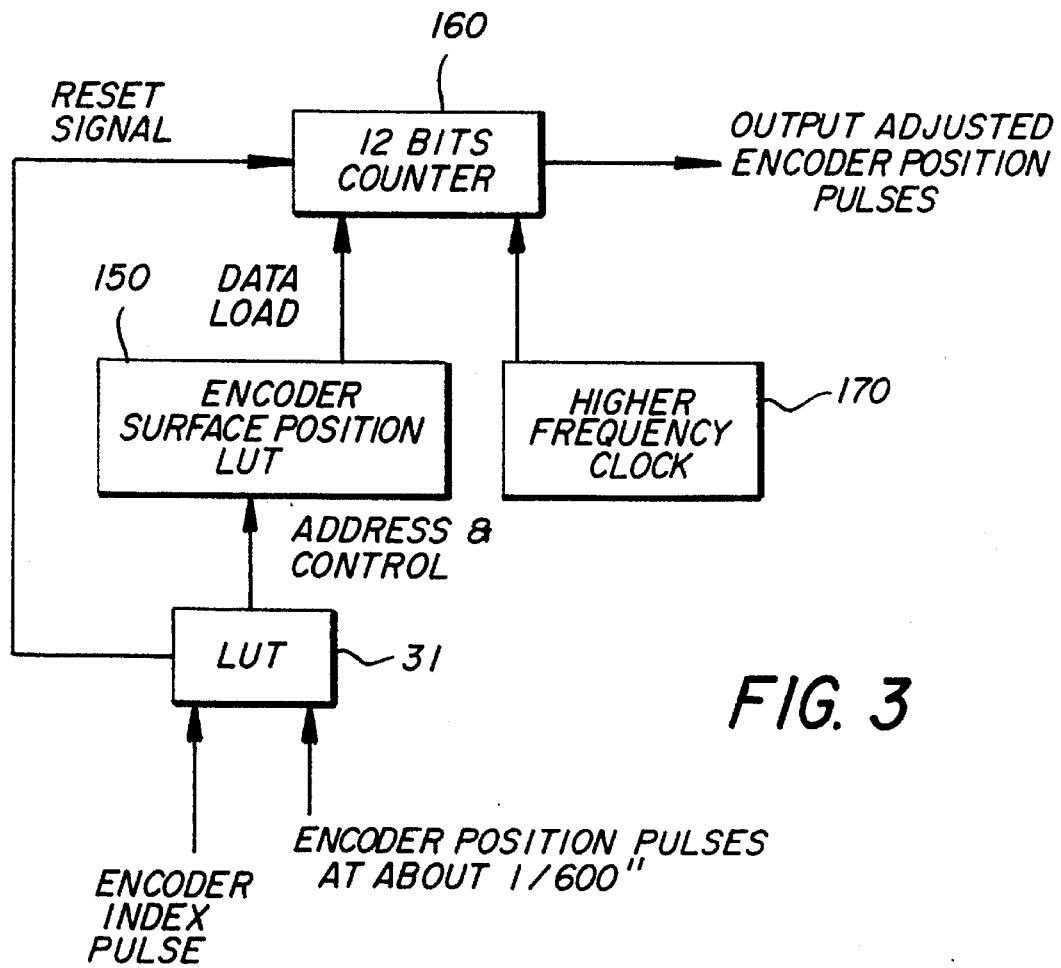
FIG. 3 is a schematic of the improved encoder device of the invention.
Figure 2:
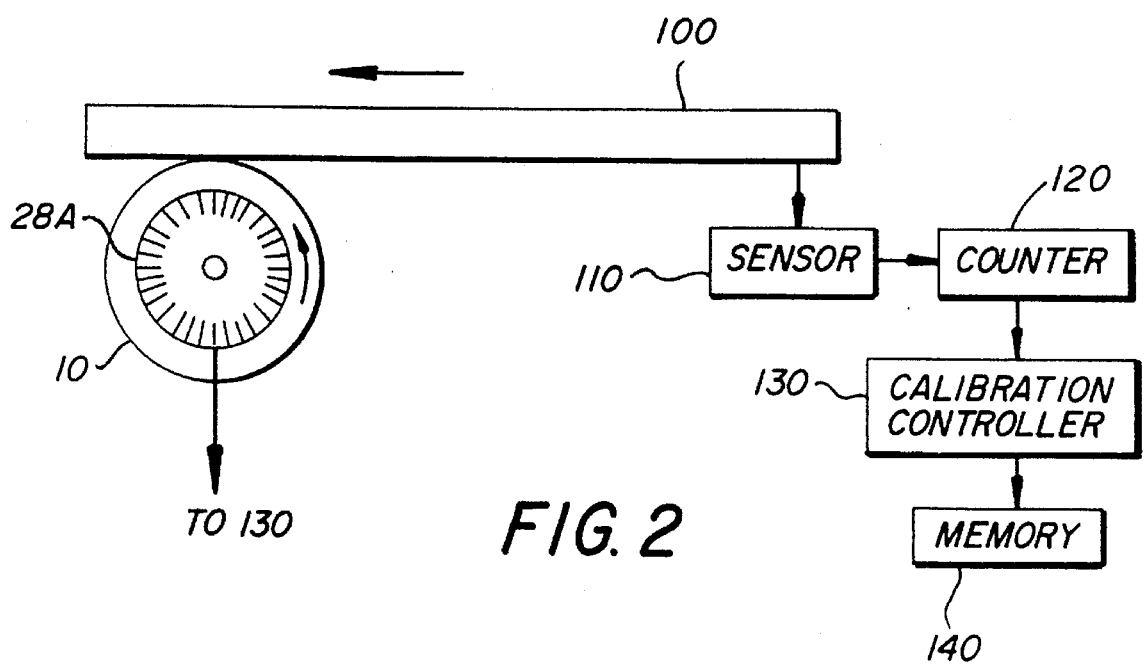
FIG. 2 is a schematic of a step used in developing an improved encoder device of the invention.

With reference now to FIG. 2, each encoder roller is processed with a high resolution linear encoder device 100 that moves upon the encoder roller surface as the roller is rotated during a calibration procedure. For example, the device may have a resolution of 5000 (high resolution) lines per inch. Starting with the head index location on the encoder roller the number of high resolution encoder pulses are sensed by sensor 110 which generates a pulse for each higher resolution indicium that passes by the sensor. These pulses are counted by a counter 120 between each of the low resolution encoder pulses. These counts are then caused by a calibration controller 130 to be stored in memory. Each of the other encoder rollers are similarly processed and the results stored in memory 140. From these results, a look-up table to be associated respectively with each of the three encoder rollers is developed. The look-up tables are developed so as to provide respective counts at which each writer is to print each of the 3150 lines until the encoder wheel makes one full resolution and the encoder head index pulse is reset. As may be seen in FIG. 3, the LCU 31 receives encoder head index pulses from each encoder roller and encoder position pulses at about $\frac{1}{600}$ inches of web movement from each roller. The encoder position pulses are used by the LCU to generate an address in the corresponding look-up table 150 for that encoder to generate a count load signal that will be loaded into a 12-bit counter 160. A second input of the counter receives clock pulses from a high frequency (say 12.3 MHz) clock 170. The counter 160 is thus a programmable counter and receives the count load signal that programs the counter for a programmed count value. The clock pulses are counted by the counter to that count value and emit, when the programmed count is reached, an adjusted encoder position pulse for that encoder. Them may be separate counters associated with each encoder wheel and each receives a respective count for that pixel line recording period. The 12-bits counters are each reset for every real encoder (approximate $\frac{1}{600}$ inches) pulses emitted by the respective encoder rollers. The adjusted encoder position pulses are communicated to the writer interface 9 that controls the flow of pixel data to each writer 30, 32, and 34 and provides a synchronizing signal that is responsive to the adjusted encoder pulse for recording each pixel recording line by that writer.

In lieu of use of a programmable counter for counting clock pulses, a shift register may be loaded with a programmed sequence of digital 1's and 0's wherein say the 1's are used as adjusted encoder pulses. A high speed clock then causes the data in the shift register to be unloaded. The programmed sequence is based on the determinations made during the calibration procedure as to when adjusted encoder pulses should be made.

Although the invention has been described and finds particular utility with reference to a multicolor reproduction process where two or more color images are recorded on an image frame, the invention is also useful on reproduction processes where color images are recorded on separate image frames and these are developed and transferred in register to a transfer sheet. The invention is also useful in recording for recording on other media such as thermal, inkier and photographic film.

The invention has been described in detail with particular reference to preferred embodiments thereof. However, it will be understood that variations and modifications may be effected within the spirit and scope of the invention.

I claim:

1. For use with a non-impact printer of the type in which a receiver is moved past a printhead; an encoding device comprising:

a roller having a peripheral surface adapted to be engaged with said receiver for rotation as said receiver moves in engagement with said roller surface;

encoder pulse generating means associated with said roller and generating encoder position pulses in response to rotation of said roller;

a look-up table of data;

means responsive to the encoder position pulses for generating an address to the look-up table; and means responsive to data output from the look-up table for generating adjusted encoder position pulses for adjusting for nonuniformities in the roller diameter and for a variation in roller diameter from an ideal diameter.

2. The device of claim 1 and wherein a programmable counter receives data output from the look-up table to establish a count value; a clock is coupled to the counter and generates clock pulses, the counter counts the clock pulses and upon reaching the count value generates an adjusted encoder position pulse.

3. A multicolor non-impact printer comprising:

a photoconductive image receiver;

means for uniformly charging said receiver;

means for imagewise exposing said receiver to cream a first electrostatic image;

means for applying a toner of a first color to said first electrostatic image to create a first toner image of said first color;

means for imagewise exposing said receiver to create a second electrostatic image in the same general area as said first toner image;

means for applying toner of a second color to said second electrostatic image to create a second toner image which, with said first toner image, forms a multicolor toner image;

wherein said means for exposing includes a line printhead device for recording a line of pixels; an encoder roller associated with said line printhead device and the roller rotates with movement of said receiver and generates encoder position pulses; a look-up table of data; means responsive to the encoder position pulses for generating an address to the look-up table; and means responsive to data output from the look-up table for generating adjusted encoder position pulses for adjusting for nonuniformities in roller diameter and/or a variation in roller diameter from an ideal diameter.

4. The device of claim 3 and wherein a programmable counter receives data output from the look-up table to establish a count value; a clock is coupled to the counter and generates clock pulses, the counter counts the clock pulses and upon reaching the count value generates an adjusted encoder position pulse.

5. A method for improving the registration of color images in a nonimpact printer, the method comprising:

rotating a peripheral surface of a roller that is engaged with a receiver that is to receive the color images;

generating encoder position pulses in response to rotation of said roller;

in response to the encoder position pulses generating an address to a look-up table;

in response to data output from the look-up table generating adjusted encoder position pulses that adjust for nonuniformities in the roller diameter and for a variation in roller diameter from an ideal diameter; and in response to said adjusted encoder position pulses enabling recording of a line of picture elements on said receiver.

6. The method of claim 1 and wherein a programmable counter receives data output from the look-up table and establishes a count value in response to said data; the counter counts clock pulses and, upon reaching the count value, generates an adjusted encoder position pulse.

* * * * *